United States Patent [19]

Marabeas

[11] 4,362,184
[45] Dec. 7, 1982

[54] VALVE WITH SPRING BIASED SEAL

[76] Inventor: Iakovos Marabeas, 50A Hudson View A, Upper Nyack, N.Y. 10960

[21] Appl. No.: 116,045

[22] Filed: Jan. 28, 1980

[51] Int. Cl.³ .............................................. F16K 15/02
[52] U.S. Cl. .................. 137/516.29; 137/536; 137/543.19; 251/176
[58] Field of Search ................. 137/538, 540, 543.19, 137/516.27, 516.29, 536; 251/176, 186, 174

[56] References Cited

U.S. PATENT DOCUMENTS

| | | | |
|---|---|---|---|
| 3,191,617 | 6/1965 | Maddox | 137/516.29 |
| 3,199,833 | 8/1965 | Skinner, Sr. | 251/176 |
| 3,324,880 | 6/1967 | Roberts et al. | 137/516.29 |
| 3,642,248 | 2/1972 | Benware | 251/176 X |
| 4,044,994 | 8/1977 | Priese | 251/174 X |
| 4,071,220 | 1/1978 | Iino | 251/174 |
| 4,213,021 | 7/1980 | Alexander | 137/540 X |
| 4,239,242 | 12/1980 | Burns | 277/166 |
| 4,258,901 | 3/1981 | Zinnai et al. | 251/174 X |

*Primary Examiner*—Robert G. Nilson
*Attorney, Agent, or Firm*—Robert W. Fiddler

[57] ABSTRACT

A valve in which a member is movable within the valve body so as to open and close access to a passage within the valve, and, when the movable member is closing access to the passage within the valve, a sealing member is engaged between the movable member and an end wall of the passage. The sealing member is made of a flexible but non-resilient material, and elasticity is imparted by means of a resilient member which causes the non-resilient material to be forced into engagement with the end wall. Limits are set for relative movement of the end wall and the movable member to prevent damaging flexure of the non-resilient material.

9 Claims, 6 Drawing Figures

U.S. Patent  Dec. 7, 1982  4,362,184
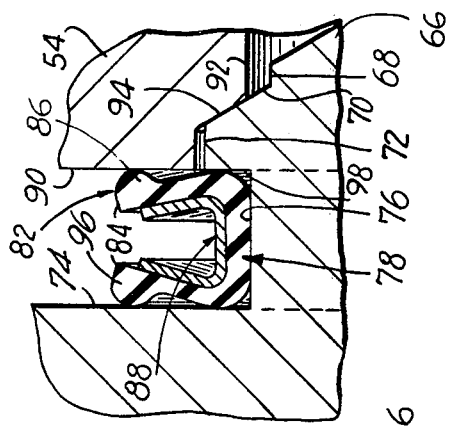
FIG.4
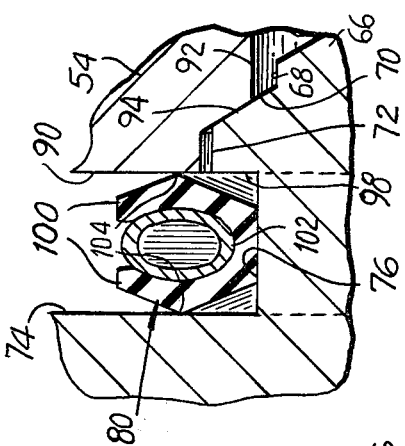
FIG.6
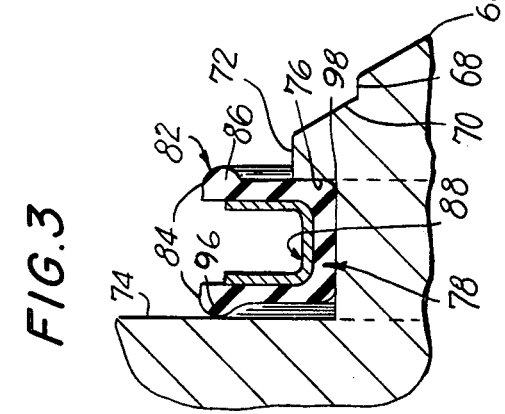
FIG.3
FIG.5
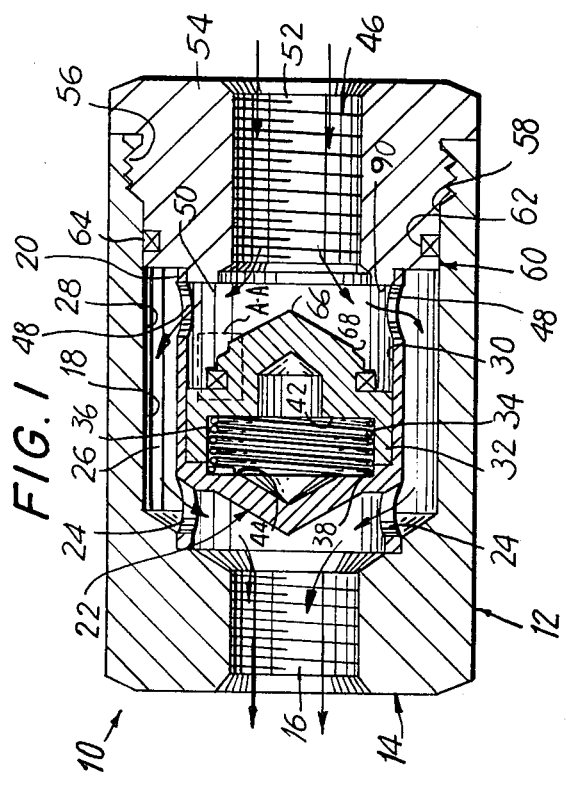
FIG.1
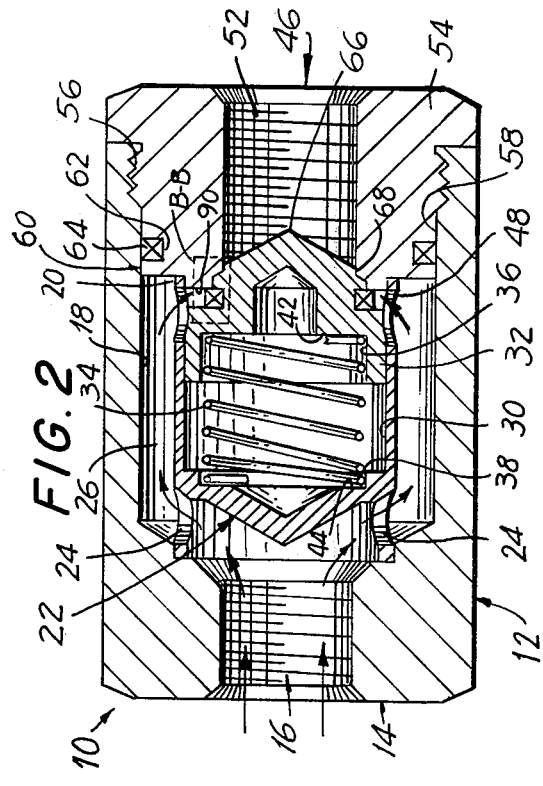
FIG.2

VALVE WITH SPRING BIASED SEAL

SUMMARY OF INVENTION

The invention is concerned with a valve wherein a flow governing member is movable within the valve body. In one position, the movable member moves to engage against a stationary end wall of a passage through the valve body. A sealing member is carried by the movable member, and functions to seal against fluid flow when the passage is to be sealed. The sealing member is formed from a positive sealing material which, while non-resilient because of its basic composition, still is capable of limited flexure when it engages against the end wall of the passage. Resiliency for the sealing material is derived from a member assembled with the positive sealing material so that the sealing material tends to move into position for sealing engagement with the end wall when the movable member moves the sealing material toward engagement with the end wall. The material making up the positive sealing material could be damaged by too much flexure. Means are provided by related formations on the movable body, where the positive sealing material may be retained, and on an end of the passage through the valve body, to limit movement of the movable member and thus limit flexure to protect the sealing material.

The invention provides a valve structure wherein an internally movable member carries sealing material which normally is pressed, by resilient means, for sealing engagement between the movable member and a stationary part of the valve body so as to produce positive sealing engagement while, at the same time, providing means which positively limits the extent of movement of the movable member so that the sealing material is protected against a damaging amount of flexure.

The invention further provides a check valve which has an internal passage to be controlled by a member movable within the valve body, where the movable member, by its movement, opens and closes communication between the inlet and outlet of the check valve, and, in the closed position, the movable member causes flexure of a member made of material which is flexible but non-resilient, which material may be damaged if flexure proceeds beyond a known limit, where the movable member and the passage through the valve are provided with means to prevent the movable body from causing excess flexure of the flexible but non-resilient material.

BRIEF DESCRIPTION OF DRAWINGS

In the drawings, in which the same reference characters refer to the same parts throughout, and in which are disclosed such constructions, FIG. 1 is a vertical cross-sectional view through the body of a check valve, showing the position of the parts when flow is being permitted through the valve by fluid pressure from the inlet side;

FIG. 2 is a view, similar to FIG. 1, but showing the position of the parts of FIG. 1 when the flow from the inlet has been cut off, and there is a tendency for backflow, whereupon the parts of the valve move to prevent such backflow;

FIG. 3 is a detail cross-sectional view to enlarged scale of a portion of FIG. 1 indicated by the dotted line box A—A on FIG. 1, showing the construction of one form of sealing member positioned in a seat in the movable member of the valve;

FIG. 4 is a detail cross-sectional view to enlarged scale of a portion of FIG. 2, indicated by the dotted line box B—B on FIG. 2, illustrating the result when the parts of the valve move to the position shown in FIG. 2;

FIG. 5 is a detail cross-sectional view, similar to FIG. 3, showing a different form of sealing means; and FIG. 6 is a detail cross-sectional view, similar to FIG. 4, but showing the action when the sealing member of FIG. 5 is substituted for the sealing means of FIG. 3.

DESCRIPTION OF PREFERRED EMBODIMENTS

To illustrate certain of the principles of the invention, it is shown as part of the structure of a valve 10. In this case, valve 10 is in the form of a check valve having a valve body 12. At outlet end 14 of body 12 a screw threaded bore 16 may be provided. Beyond bore 16, the interior of the valve body is enlarged into an unthreaded bore 18. Secured in bore 18, as, for instance, by press fitting, is a sleeve 20. Formed integrally with sleeve 20 is a wall 22. Thus wall 22 is stationary at all times.

Immediately at wall 22 on the side of outlet end 14, sleeve 20 has a set of openings 24. These openings provide communication from bore 16 to a passage 26 between sleeve 20 and walls 28 of bore 18.

Slideably mounted on inner wall 30 of sleeve 20 is a piston-like member 32. A resilient member, such as spring 34, when compressed as shown in FIG. 1, is encased within a circumferential wall 36, formed as a part of piston member 32, and a recess 38 formed on the inner face of wall 22. Spring 34 engages against face 42 at wall 36 and face 44 at recess 38. Spring 34 tends to force member 32 in the direction toward inlet end 46.

Adjacent to inlet end 46, a number of openings 48 are provided through sleeve 20. Openings 48, when member 32 assumes a proper position, provide communication from passage 26 to area 50 in front of piston member 32. Area 50, as shown in FIG. 1, is in open communication with bore 52. Bore 52, formed with screw threads for proper connection with a source of fluid pressure, is part of a plug 54 which, in turn, is retained, as, for instance, by screw threads 56, in the walls of passage 26 beyond the end of sleeve 20. A portion of plug 54 may be provided with a smooth cylindrical surface 58 for cooperation with a cooperating smooth cylindrical surface 60 at the end of passage 26. Recess 62, formed in surface 58, may receive suitable sealing means 64.

Member 32 has an end wall 66 shown as having a conical shape. This conical shape permits end wall 66 to fit into bore 52. End wall 66 ends in a circumferential wall 68 which then ends at a circumferential wall 70 (as best seen in FIG. 3) which forms an obtuse angle with wall 68. The result here is a circumferential projection 72 which in turn is spaced from an end wall 74 to provide a circumferential recess 76. In recess 76 is positioned a circumferential sealing member 78. One form 78 of sealing member is shown in FIGS. 3 and 4; another form 80 of the sealing member is shown in FIGS. 5 and 6.

Sealing member 78, shown in FIGS. 3 and 4, is in the form of a U-shaped member 82. The material from which member 82 is formed may be material such as Teflon, a material which has great sealing properties. However, in the form used in this valve, the material, while flexible, is not resilient. In the shape shown in FIGS. 3 and 4, member 82 has arms 84 which terminate in protuberances 86, which will be described further.

In order that member 82 function properly at the required times for the operation of sealing, member 82 is imparted, in addition to its ability to flex, the function of being capable of being returned to a normal position as the valve members operate. For this purpose, a resilient member, preferably a circumferential spring 88, is positioned between arms 84. The shape of spring 88 follows closely the contouring of the inner faces of arms 84.

End wall 90 of plug 54 (see FIG. 4) has circumferential surfaces 92 and 94 shaped to complement the walls of projection 72. Thus, when, as appears in FIG. 4, an end face 90 of plug 54 moves toward engagement by protuberance 86, both protuberances 86 and 96 engage their respective end face 90 and end wall 74 to produce a positive seal. However, when end wall 66 moves away so as to free protuberance 86 from engagement with end face 90, spring 88 moves that protuberance out into position for further engagement by end face 90. Wall 98 of recess 76 ends short of the full extent of face 90 against which protuberance 86 is to be engaged as end wall 66 moves into proper position for that purpose.

End wall 90 is stationary at all times. The distance across between end wall 90 and surfaces 92 and 94 is determined so that when the formations on end wall 66 engage surfaces 92 and 94, the formations on end face 90 will just have had sufficient contact with protuberance 86 to cause the necessary flexure to produce positive sealing action. The properties of the sealing material are known, and the degree of permissible flexure is known. Thus, the engagement of surface 94 with wall 70 will be a determinant on this amount of flexure, which still will result in the required positive sealing engagement of protuberances 86 with face 90 to insure the desired sealing.

In FIGS. 5 and 6, the sealing member is shown as a U-shaped member 80 which has a somewhat hexagonal shape, but with one side removed. Within arms 100 of member 80 is seated a tubular spring 102 of substantial cylindrical cross-section. The same relationship of surfaces 92 and 94 to walls 68 and 70 is relied upon to cause compression of sealing member 80, so that the resilience of cylindrical spring 102 acts to cause compression of sealing member 80 against the walls of the recess and projection 72. Member 80 has an edge 104 which is engaged by face 90 to effect this compression of member 80.

Thus there results the necessary compression of the sealing material, but with predetermined limitation of that compression in order to protect that material against damage if the compression of the sealing material were permitted to go beyond the limit.

The type of valve here described is specially adapted to control the flow of fluid which could have corrosive action on metals used for springs 88 and 102. Springs 88 and 102 are related to the fluids flowing through their respected valves by being constructed from metals on which the respective fluids have minimal to no corrosive action.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. A valve structure comprising:
   a valve body with an inlet and outlet connected by a fluid passing bore, having an area of reduced cross-section adjacent the outlet;
   a piston-like member movable in said bore towards a fixed bore endwall extending in a plane perpendicular to the axis of movement of said piston-like member;
   said piston-like member formed with a conical endwall movable into a mating conical portion in the bore endwall to block same;
   a circumferential recess in said piston-like member adjacent the conical endwall, said recess having two opposed walls, one wall of which is short and the other long, the short wall movable into the conical portion of the bore;
   a resilient easily bent in elastic sealing member in said recess, said sealing member circumferentially surrounding said piston-like member, and formed with spaced legs extending above the short wall, and shorter than the long wall of said recess; and
   elastic means between the legs of said sealing member urging same apart from each other, whereby upon movement of said piston-like member to a bore blocking position, the legs will be compressed between the stationary bore endwall and the long wall of the recess.

2. A valve structure as in claim 1, in which said sealing member is formed of Teflon.

3. A valve structure as in claim 1, in which said elastic means comprise a metalic spring member.

4. A valve structure as in claim 1, in which said sealing member is U-shaped in transverse cross-section.

5. A valve structure as in claim 4, in which said elastic means comprise a metalic spring U-shaped in cross-section with legs lying against and outwardly biasing the legs of said sealing member.

6. A valve structure as in claim 4, in which said legs are formed with protruberences at their upper ends.

7. A valve structure as in claim 6, in which a U-shaped resilient spring is positioned between legs of said sealing member, to extend thereagainst a distance not including said protruberences.

8. A valve structure as in claim 1, in which said resilient spring comprises a tubular spring.

9. A valve structure as in claim 8, in which said spring is circular in cross-section when unstressed.

* * * * *